July 19, 1955
C. L. PETCH
2,713,522
CARTRIDGE TYPE PACKING GLAND
Filed July 18, 1951
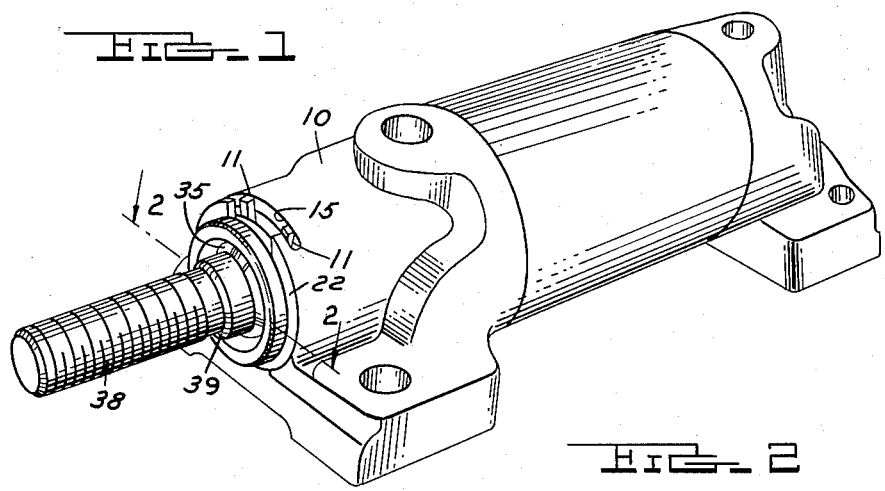
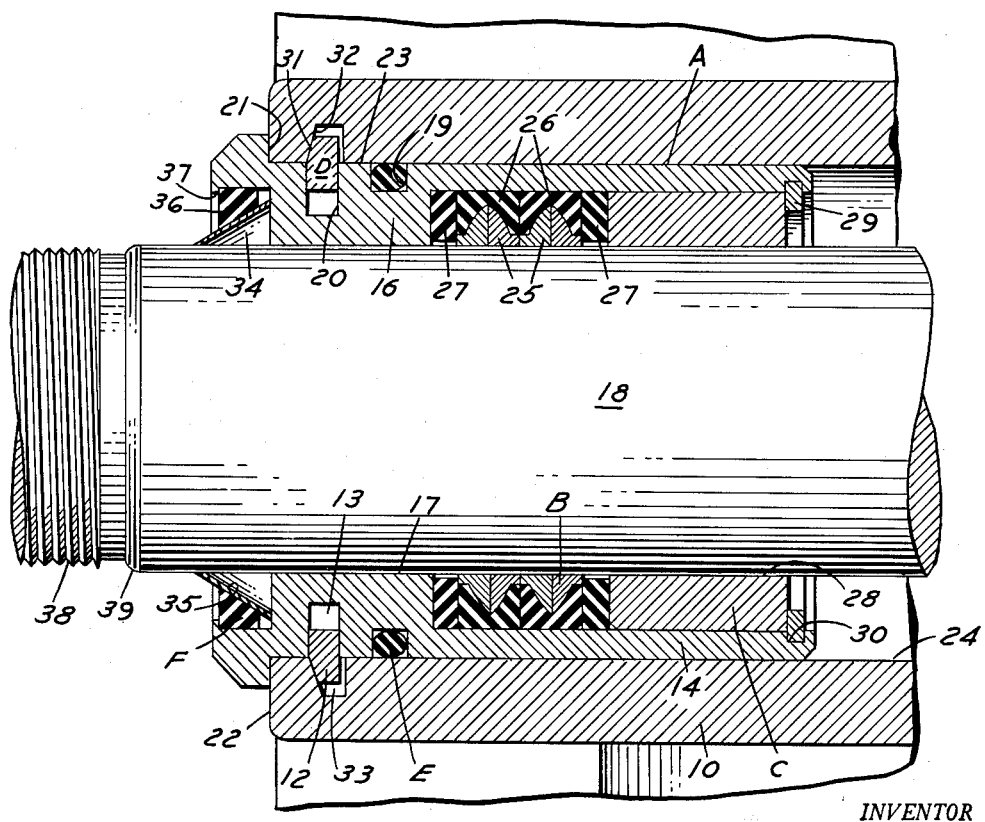
INVENTOR
CHARLES L. PETCH
BY
Farley, Forster & Farley
ATTORNEYS

United States Patent Office 2,713,522
Patented July 19, 1955

2,713,522
CARTRIDGE TYPE PACKING GLAND

Charles Lorenz Petch, Grosse Pointe, Mich.

Application July 18, 1951, Serial No. 237,471

1 Claim. (Cl. 308—3)

This invention relates to a cartridge type packing gland for use in hydraulic and air cylinders to provide a seal between the piston rod and the cylinder head.

Conventional packing glands are inserted directly between the cylinder head and the piston rod, requiring the individual packing elements to be separately inserted and removed in assembling or replacing the packing. The present invention contemplates an integral cartridge type packing gland assembly which may be inserted and removed as a unitary complete assembly.

The advantages sought by this cartridge type assembly are several. By enclosing the packing in a cartridge which may be readily installed and removed as a unit, the servicing of cylinders in replacement of packing may be greatly facilitated.

In addition, one of the principal objects of the present construction is to provide a protective bearing on either side of the packing within the cartridge assembly which will serve as a guide for the piston rod on both sides of the packing in order to substantially eliminate any misalignment or deflection under load from working into the packing, thereby substantially increasing the efficiency and life of the packing.

Another object is to provide an O ring seal between the outer surface of the cartridge and the cylinder head, which opposed surfaces remain stationary relative to each other once the cartridge assembly is installed.

Another object is to provide a snap ring retaining means for holding the cartridge assembly in its proper longitudinal position in the cylinder head with the ends of the snap ring exposed in order to further facilitate rapid initial assembly and installation of replacement cartridges.

A further object of the invention is to provide a shoulder in the outer cartridge shell for abutting engagement with the end of the cylinder head, together with a tapered surface both in the snap ring and a cooperating groove in the cylinder head whereby expansion of the snap ring will force the shoulder of the cartridge into firm abutting engagement with the end of the cylinder head and thereby hold the cartridge firmly against any longitudinal play or rotation as a result of reciprocal movement of the piston rod or any vibration imparted to the piston rod or cylinder head.

Another object is to incorporate within the cartridge assembly a seal guard scraper which will, when the piston rod is retracted into the cylinder, clean off any dirt or foreign particles which may become attached to the exposed surface of the piston rod in its outer position, thereby preventing any such dirt particles from moving into wearing contact with the packing.

These and other objects will appear more clearly from the following detailed description of a particular embodiment of my invention and from an examination of the drawings forming a part thereof wherein:

Fig. 1 is a perspective view of a complete cylinder assembly showing the end of the cartridge type packing gland in assembled position within the cylinder head; and Fig. 2 is a sectional view through the cylinder head, gland and piston rod assembly taken along the line 2—2 of Fig. 1 showing in detail the respective parts comprising the assembly.

Referring to these views, it will be seen that the cartridge assembly is an integral unit which may be installed and removed from a cylinder head 10 by grasping the projecting ears 11 of the snap ring 12 with a pliers or other suitable tool and collapsing the same into groove 13 formed in the wall of the cartridge shell 14, whereupon the entire cartridge assembly may be slipped into or out of the end of the cylinder head 10, the open-ended slot 15 in the cylinder head 10 being constructed to permit the passage of the snap ring ears 11 when the ring is in a collapsed state, and the outer diameter of the cartridge shell 14 being provided with a slip fit relative to the bore of the cylinder head.

The cartridge assembly comprises a main cartridge body A, packing assembly B, bushing C, retainer ring D, O sealing ring E, and a seal guard assembly F.

The main cartridge body A is provided with a heavy bearing section 16 having its inner wall formed with a bore 17 having a sliding fit with a piston rod 18, and having its outer wall formed with a rectangular groove 19 adapted to retain the O ring seal E. A second rectangular groove 20 is adapted to accommodate the entire retainer snap ring D when the latter is in its collapsed condition. A shoulder 21 is formed near the end of the cartridge body which is adapted to abut against end 22 of the cylinder head 10. The outer wall 23 of the main cartridge body A is, as previously mentioned, dimensioned to provide a slip fit within the bore 24 of the cylinder head 10 and includes an extended shell portion 14 to house the packing B and the bushing C.

The packing subassembly B proper may comprise any well-known or suitable packing elements. One type which is well adapted for use in the present cartridge assembly is that shown, comprising a plurality of babbitt rings 25 which are split both transversely and radially, the radial separations being located 180° apart in each pair of ring elements and the closed inside diameter of the ring elements being somewhat less than the diameter of the piston rod 18 in order to permit a degree of compression and follow up from wear at the surface contacting the surface of the piston rod. A pair of molded neoprene backup rings 26 may be employed as a resilient backing for the babbitt rings 25 urging them into a sealing contact with the surface of the piston rod 18, while further neoprene rings 27 of rectangular cross-section may be employed at either end of the backup rings to support and apply end pressure against the backup rings 26. These latter rings are provided with internal diameter clearance relative to the piston rod 18 so that the only contacting elements of the packing are the babbitt rings themselves.

An extended bronze bushing C is housed within the outer end of the shell 14 and is dimensioned longitudinally to provide desired compression against the packing subassembly so as to assure a desired initial back-up pressure against the babbitt rings 25 to assure proper functioning of the resilient elements in the packing in continuing to apply radial pressure against the babbitt rings as they wear with continued use, thereby to insure maximum life of the packing. The inside diameter 28 of the bushing element C is dimensioned to provide a sliding bearing fit with the piston rod 18, and such bushing is held in desired assembled position against the packing B by a simple snap ring 29 which engages the outer end of the bushing C and is retained by a groove 30 formed in the outer end of the shell 14.

The extended bearing surface of this bushing, together with the extended bearing surface of the main body of the cartridge on the other side of the packing, form a highly important feature of the present construction in serving as a firm extended guide for the piston rod 18 which completely protects the packing seal against wear through deflection or misalignment, as distinguished from the conventional gland wherein little or no bearing surface is provided outside of the packing. In practice, this feature has been found to multiply the life of the packing by several times in typical operations.

Since, after assembly, the main cartridge body A comprises a stationary element relative to the cylinder head 10, the simple neoprene O ring seal E provides an effective seal against leakage between the cylinder head and cartridge body. In order to insure the extended life of such seal throughout the life of the packing, it is essential that the cartridge body be held firmly against any longitudinal or rotative play relative to the cylinder head during operation of the piston which, if permitted, would rapidly induce destructive wear with respect to the sealing properties of the O-ring. Accordingly, a snap ring D has been employed which has a tapered surface 31 adapted to engage with flush contact a cooperating tapered surface 32 formed in the groove 33 in the cylinder head in order to wedge the shoulder 21 of the cartridge body against the end 20 of the cylinder head in response to the expansion of the snap ring D upon release of the ears 11 of such ring after insertion of the cartridge assembly within the cylinder head. Radial clearance is provided in the groove 33 relative to the outermost position of the ring D as well as clearance at the inner side surface of the groove 33 in order to permit the full wedging action of the tapered ring to take place notwithstanding practicable manufacturing tolerances in the ring groove shoulder and longitudinal dimensions. Such wedging action induced by the stressed condition in the ring assure positive longitudinal location of the cartridge body relative to the cylinder head and prevents any drag from reciprocating action of the piston rod, or vibration, or any other forces from producing movement of the packing cartridge relative to the cylinder head.

In the outer exposed end of the cartridge body A, a recess 34 is provided to accommodate a seal guard scraper F, which consists of one or more radially split conical scraping elements 35 resiliently held in scraping contact with the piston rod 18 by a resilient neoprene ring 36 adapted to bear against the scraper elements 35 and retained in assembled position by a lip 37 formed in the extreme end of the recess.

From the above description it will be readily understood that the complete cartridge packing assembly may be pre-assembled as an integral unit and readily installed by merely sliding the cartridge assembly over the end of the piston rod 38, the tapered surface 39 expanding the pre-loaded babbitt rings 25; then, with ears 11 held together by pliers or suitable tool pressing the ring D into the groove 13, the entire assembly may be slid into the cylinder head, whereupon release of the snap ring ears 11 will permit expansion of the ring into the groove 33 in the cylinder head, with the wedging action previously described positively and solidly locating the cartridge packing gland.

While a particular embodiment of our invention has been described above in detail, it will be understood that numerous modifications of the various component parts might be resorted to without departing from the scope of the invention as defined in the following claim.

I claim:

In a pressure cylinder having a cylinder head and a piston rod adapted to pass therethrough, an integral cartridge packing gland interposed between said cylinder head and said piston rod having an outer surface adapted to be seated in said cylinder head, and inner bearing and packing portions adapted respectively to guide said piston rod and seal against the escape of fluid along the surface thereof, a resilient sealing ring on the outer surface of said gland adapted to sealingly engage said cylinder head, an annular flange at the end of said gland adapted to engage the end of said cylinder head, opposed cooperating grooves in the outer surface of said gland and the adjacent surface of said cylinder head intermediate said sealing ring and said flange, a tapered surface on the side wall of one of said grooves and a tapered snap ring adapted to seat against said tapered surface and force the end of said flange into abutting contact with the end of said cylinder head.

References Cited in the file of this patent

UNITED STATES PATENTS

| Number | Name | Date |
|---|---|---|
| 1,093,620 | Hanna | Apr. 21, 1914 |
| 1,507,575 | Brouse | Sept. 9, 1924 |
| 2,011,304 | Sharp | Aug. 13, 1935 |
| 2,051,704 | Harris | Aug. 18, 1936 |
| 2,075,645 | Hamilton | Mar. 30, 1937 |
| 2,211,898 | Knoth | Aug. 20, 1940 |
| 2,390,445 | Mercier | Dec. 4, 1945 |
| 2,493,602 | Sterrett | Jan. 3, 1950 |
| 2,509,151 | Kasten | May 23, 1950 |
| 2,533,531 | Stephens | Dec. 12, 1950 |
| 2,557,835 | Monahan | June 19, 1951 |
| 2,570,117 | Hallstrand | Oct. 2, 1951 |